United States Patent
Gollner

[11] Patent Number: 5,390,759
[45] Date of Patent: Feb. 21, 1995

[54] DRIVING MECHANISM FOR AN AUTOMOTIVE PROPEL DRIVE

[75] Inventor: Wilhelm Gollner, Neumunster, Germany

[73] Assignee: Sauer Inc., Ames, Iowa

[21] Appl. No.: 104,885

[22] Filed: Aug. 10, 1993

[30] Foreign Application Priority Data

Aug. 10, 1992 [DE] Germany .............. 4226453

[51] Int. Cl.6 ........................... B60K 17/14
[52] U.S. Cl. ........................ 180/307; 180/308
[58] Field of Search .......... 180/305, 307, 308; 60/494, 445, 452

[56] References Cited

U.S. PATENT DOCUMENTS

| | | | |
|---|---|---|---|
| 4,396,087 | 8/1983 | Rock et al. | 180/308 |
| 4,554,991 | 11/1985 | Eden | 180/307 |
| 4,704,866 | 11/1987 | Myers | 180/307 |
| 5,062,498 | 11/1991 | Tobias | 180/308 |
| 5,147,010 | 9/1992 | Olson et al. | 180/308 |

FOREIGN PATENT DOCUMENTS

3529743 2/1987 Germany .............. 180/308

Primary Examiner—Mitchell J. Hill
Assistant Examiner—Kevin Hurley
Attorney, Agent, or Firm—Zarley, McKee, Thomte, Voorhees, & Sease

[57] ABSTRACT

An automotive control driving mechanism for a vehicle, such as a wheel loader or fork lift, comprising a plurality of wheels (18) supporting a vehicle frame, an engine (16) on the frame for driving the wheels (18), and a hydrostatic transmission having a variable displacement pump (12) operatively connected to the engine (16) and to at least one motor (14). The motor (14) is connected to at least one of the wheels (18) to propel the vehicle. The transmission generates a working system pressure in a pair of fluid conduits (32,34) between its pump (12) and motor (14). A microprocessor (40) is connected to a speed pickup (38) on the engine shaft (39) and conduits (32,34) of the hydrostatic transmission for controlling the displacement of the pump through swashplate (20), and thus the transmission ratio, based not only on the engine speed but also system pressure. The sensed system pressures values are embedded into microprocessor's (40) control algorithms for the transmission ratio. The transmission may also include variable displacement motors controlled in the same manner. When electronically proportional high pressure relief valves are associated with said conduits, improved braking and coasting are realized.

8 Claims, 4 Drawing Sheets

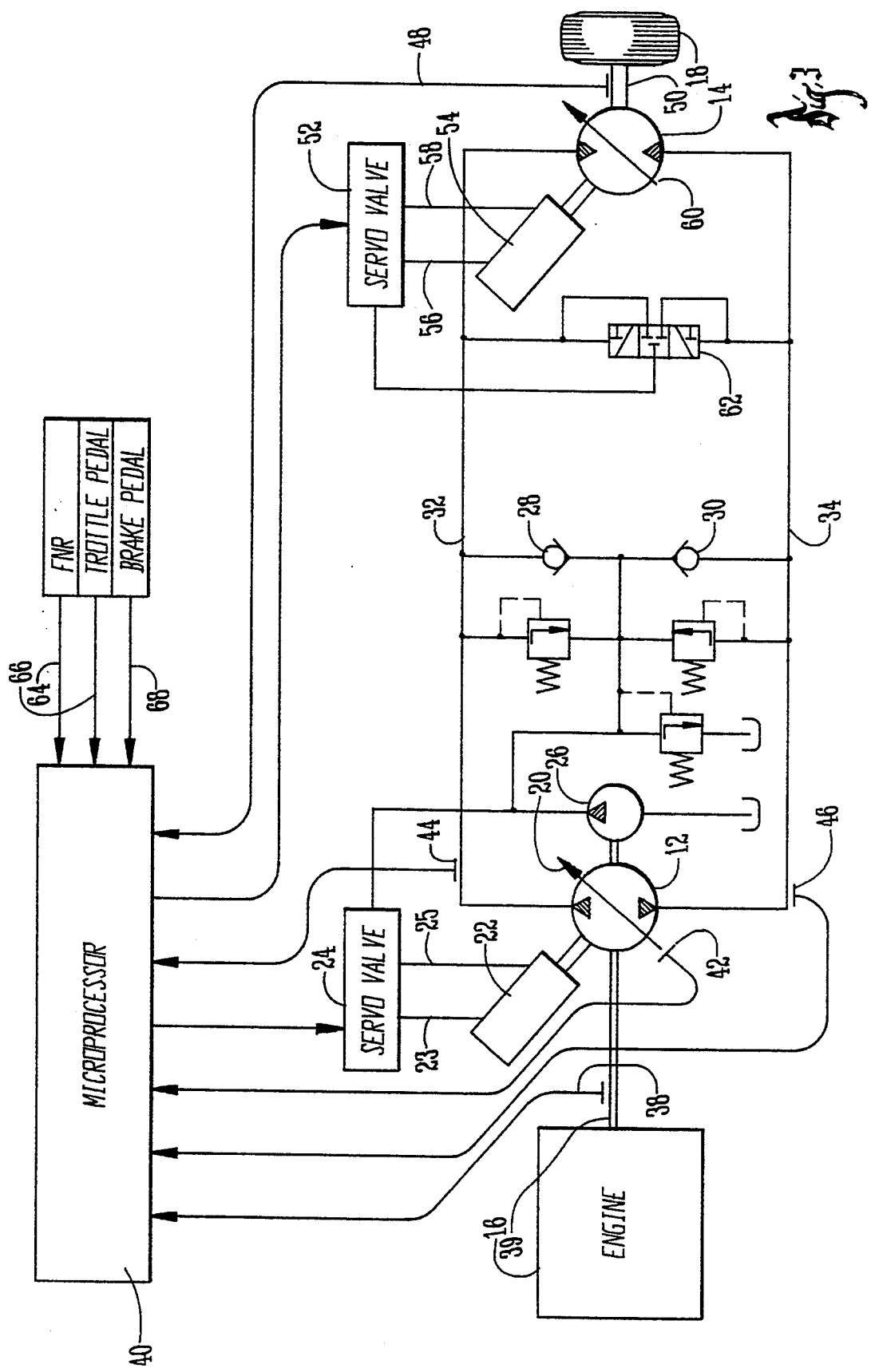

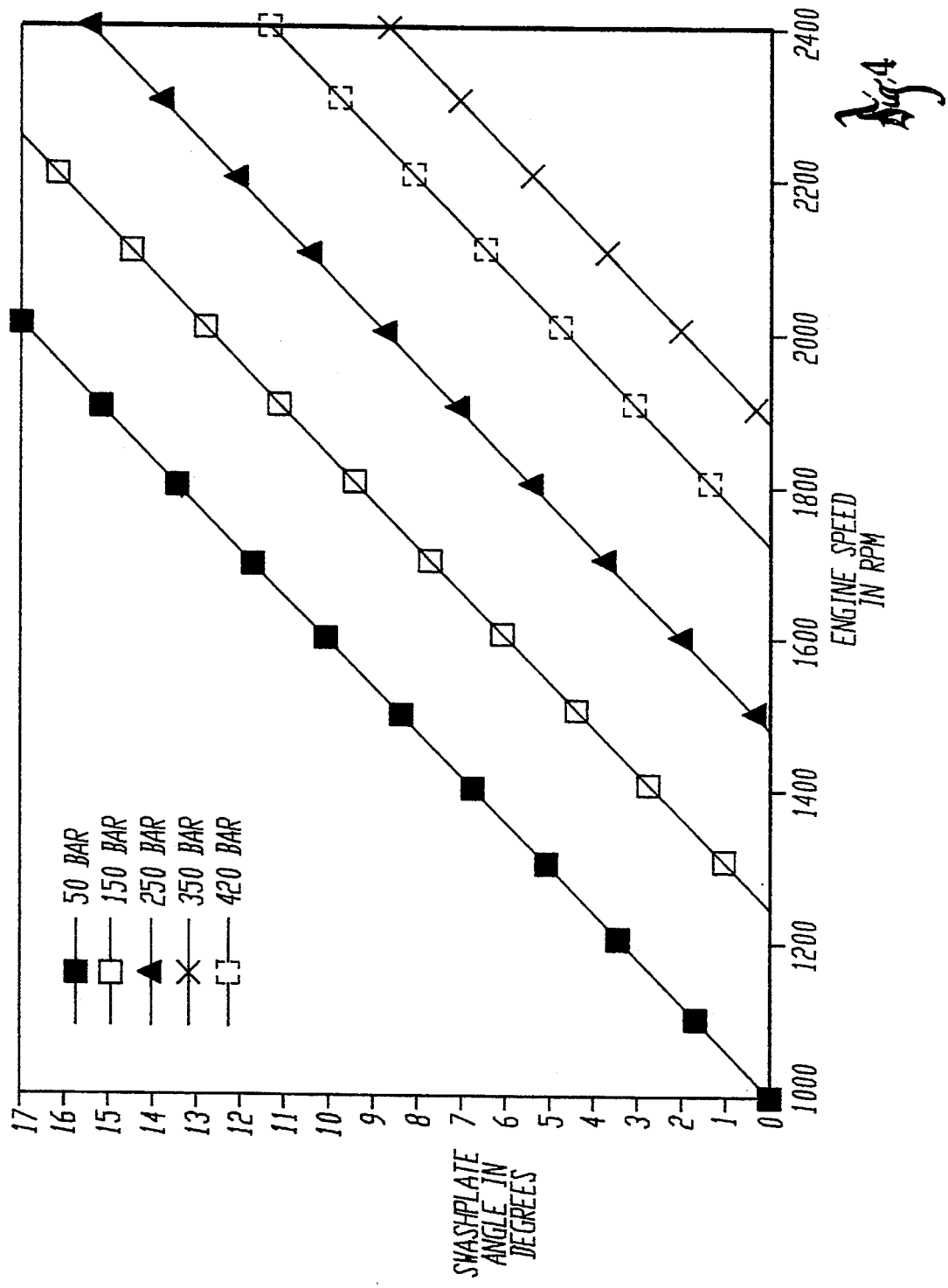

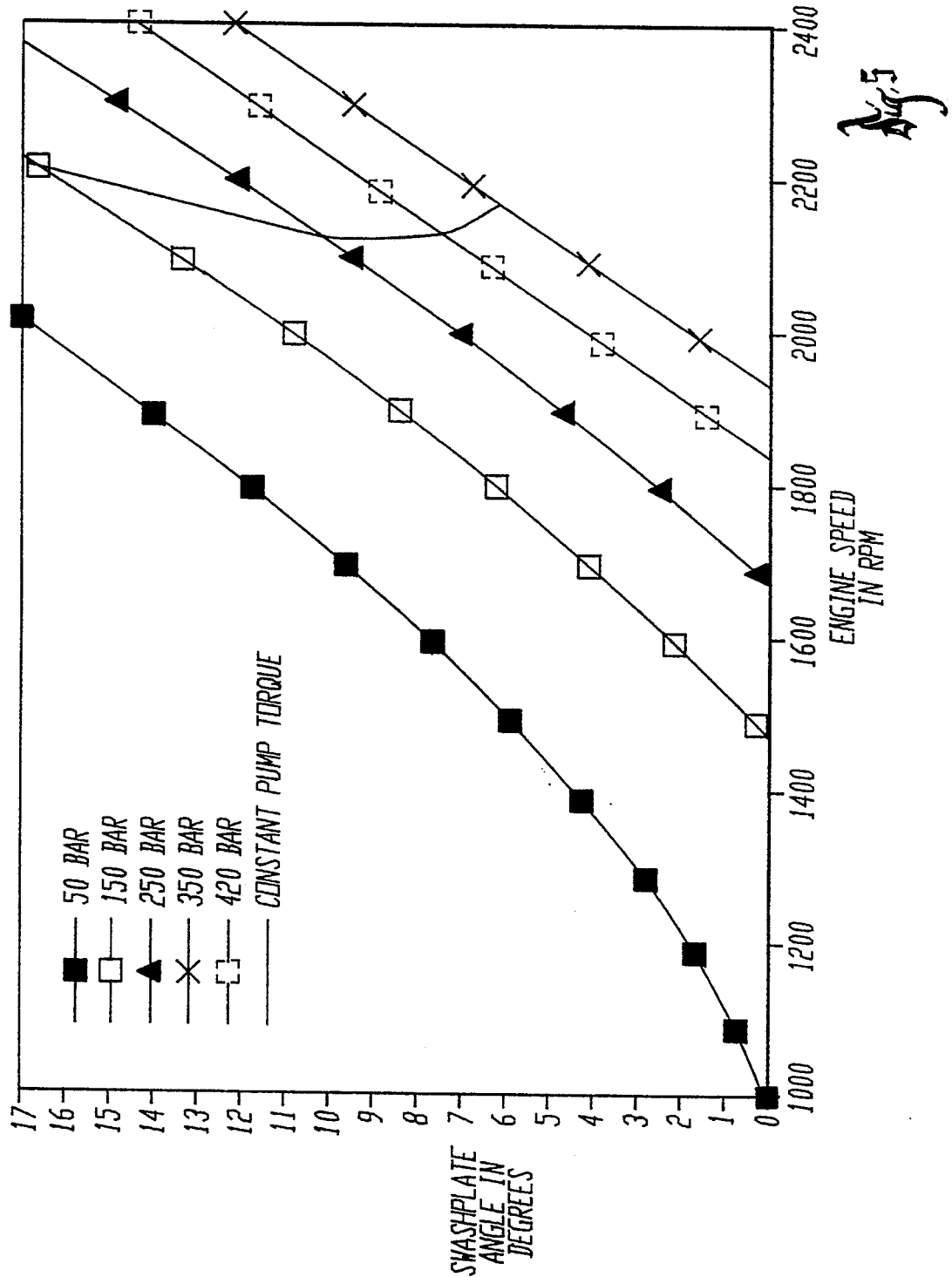

DRIVING MECHANISM FOR AN AUTOMOTIVE PROPEL DRIVE

BACKGROUND OF THE INVENTION

The invention is related to a hydrostatic driving mechanism for the propulsion of forklifts, wheel loaders and similar vehicles having automotive type controls. More particularly, the invention relates to an improvement in automotive-type controls for hydrostatic transmissions.

With conventional automotive controls, the angle of the swashplate of the pump is usually changed depending on the engine speed applied to the pump. FIG. 1 is exemplary of this relationship in a typical pump. At about 900 rpm the pump starts delivering fluid and the maximum swashplate angle is reached at about 2000 rpm.

The potential power consumption of the pumps is often about three to four times higher than the rated power of the combustion engine. Generally, maximum load or power limiting controls have been used to limit the torque of the transmission in view of the characteristics shown in FIG. 1 and the mismatch between engine and transmission power ratings. Usually, input signals are derived from the actual speed of the engine and from the position of the throttle pedal. During the operation of the vehicle for the first time, the so-called "learned" or baseline characteristic is recorded. This gives the relation between the position of the throttle pedal and the speed of the engine at speeds ranging from low idle to high idle, as shown in FIG. 2.

Therefore, when the vehicle is traveling, it is possible to detect whether the motor is delivering or consuming power by evaluating the speed of the combustion engine and the position of the throttle pedal. The rate of deviation from the baseline or "learned" characteristic corresponds to the load. Above the baseline in FIG. 2 lies a zone where speed is dropping. Below the baseline lies a zone where the vehicle is coasting. At 10% to 15% drop of speed, the governor device attached to the throttle pedal has reached its control limit and is set to full throttle. If engine speed is decreased further, the output torque of the transmission is limited to be equivalent to the maximum torque characteristic of the engine.

A load limiting control takes over at the control limit of the governor device and increases the displacement of the pump in the hydrostatic transmission. Thus, the load of the engine is reduced and a further drop of speed, or at worst the stalling of the engine, is prevented.

To achieve automotive characteristics during braking or inching condition, conventional controls reduce the swashplate angle based on the rate of change in the position of the brake pedal (inch pedal). It is hard to find a compromise for a loaded and unloaded vehicle because the braking capacity of the engine is firmly limited to about one third of its rated torque. To protect the engine from overspeed, either the ramp for the swashplate angle is modified or the above-mentioned load sensing control is applied acting in the opposite way. An increasing number of engines are smaller and turbocharged. When such engines are used in conjunction with the displacement reducing load sensing control, less braking torque is available.

Conventional automotive controls allow the vehicle to coast by reducing the swashplate angle along a given linear ramp, thereby increasing the transmission ratio. However, it is a problem to find one ramp which is suitable to provide acceptable deceleration of the loaded and unloaded vehicle. Coasting may be comfortable and acceptable on flat ground, but may easily stall the engine in climbing conditions.

Even with power and load limiting controls, conventional drive mechanisms having hydrostatic transmissions tend to respond abruptly and aggressively to commands. Uncomfortable jerking of the vehicle may result. Most vehicle manufacturers desire drive system performance similar to a hydrodynamic fluid torque converter. Such a converter reduces transmission displacement when traveling resistance is increased. The performance of the vehicle is less aggressive, which is normally said to be more smooth and comfortable. Nearly all manufacturers feel such performance to be a must in drive systems for propelling wheel loaders.

The primary objective task of this invention is to provide a driving mechanism with a hydrostatic transmission that performs similar to a hydrodynamic fluid torque converter.

Another objective of this invention is to provide an electronic control for controlling pump displacement based on engine speed and transmission system pressure to insure that the vehicle drives smoothly.

SUMMARY OF THE INVENTION

The present invention is an automotive control system or driving mechanism for a vehicle, such as a wheel loader or fork lift. The vehicle has wheels driven by an engine on a frame with a hydrostatic transmission interposed between the engine and wheels. The transmission has a variable displacement pump operatively connected to the engine and to at least one motor. The motor is connected to at least one of the wheels to propel the vehicle. During its operation, the transmission generates a working system pressure in a pair of fluid conduits between its pump and motor.

A microprocessor is connected to the engine shaft and conduits of the hydrostatic transmission for controlling the displacement of the pump, and thus the transmission ratio, based not only on the engine speed but also system pressure. The sensed system pressures values are embedded, along with throttle pedal position, engine speed, and swashplate angle, into the control algorithms for the transmission ratio.

The transmission may also include variable displacement motors controlled in the same manner. Furthermore, when electronically proportional high pressure relief valves are associated with the conduits, improved braking and coasting are realized.

BRIEF DESCRIPTION OF THE DRAWINGS

FIG. 3 is a schematic diagram of the driving mechanism of this invention.

FIG. 4 is a graph showing the influence of system pressure on the linear relationships of engine speed versus pump swashplate angle.

FIG. 5 is a graph showing the results of the present invention. The plotted engine speed versus pump swashplate angle curves follow non-linear, higher order equations, A superimposed curve illustrates how pump torque can be held constant and not exceed the maximum torque of the engine.

DETAILED DESCRIPTION OF THE PREFERRED EMBODIMENT

Figure 1:
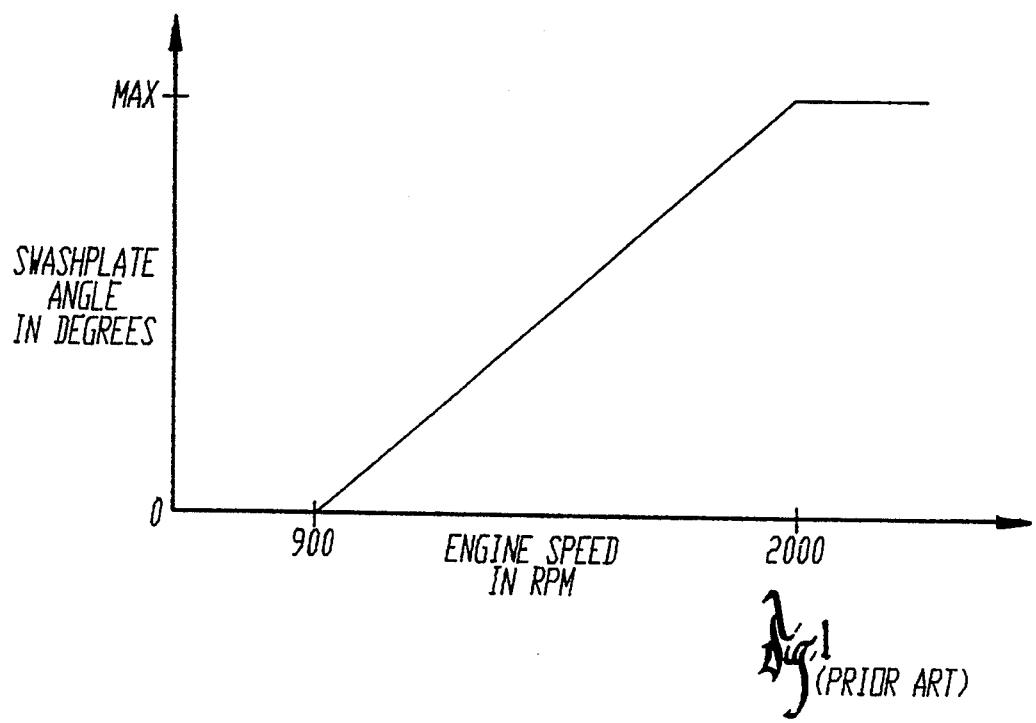
FIG. 1 is a graph showing the linear relationship between engine speed and pump swashplate angle which is characteristic of conventional automotive controls.

FIG. 3 shows the driving mechanism of this invention. A hydrostatic transmission 10 with a pump 12 for displacing fluid to at least one motor 14 is connected to an internal combustion engine 16. These components are located in the frame of a wheel loader, a fork lift truck or a similar vehicle. In wheel loaders the hydraulic motor 14 is typically connected to a gear box, which drives mechanically through cardan shafts to the differential gear box of the front and rear axle and then to the four wheels 18 (not shown). In fork lift trucks the hydraulic motor is either drivingly connected to the two front wheels through a differential gear box of the front axle or two hydraulic motors are used to directly drive each front wheel separately. In the latter case, the two motors are hydraulically connected in parallel to the pump 12.

Pump 12 is of the variable displacement type. So the flow of the pump can be adjusted infinitely from zero to maximum flow for both directions. The angle of the pump swashplate 20, and thus the displacement of pump 12, can be varied by a servo piston 22, which is linked to the swash plate based on commands from servovalve 24. Servovalve 24 is supplied with charge pressure from charge pump 26, which also replenishes the fluid losses in the low side of the loop (conduit 32 or 34) through either check valve 28 or 30. High pressure conduits 32 and 34 hydraulically connect pump 12 and motor 14 in a closed circuit loop.

Servovalve 24 sends signals to servo piston 22 through fluid passages 23 and 25. In response, servo piston 22 alters the displacement of pump 12 by moving swashplate 20. Servovalve 24 receives commands from a microprocessor 40.

A speed pickup device 38 is operatively mounted to the shaft 39 of engine 16 where it drives pump 12. It is also possible to attach the speed pickup to the pump 12. Pickup device 38 measures engine speed and sends an indicative signal to microprocessor 40 which coordinates the smooth automotive-like propulsion of the vehicle. The microprocessor 40 also receives input from an RVDT (rotary variable displacement transducer) 42 concerning the angle of swashplate 20 in pump 12. Pressure transducers 44 and 46 provide microprocessor 40 with input signals indicating the system pressure in conduits 32 and 34. These signals make it possible for microprocessor 40 to calculate a differential pressure between lines 32 and 34 which is known as system delta pressure. The microprocessor reads the system pressures of the conduits 32 and 34, the engine speed and the position of the swashplate to determine the output horsepower and the torque of the pump 12. The output torque of the engine 16 can be determined based on the position of the swashplate since the displacement of the pump is determined by the swash angle and the pressure difference between the conduits 32 and 34. Output horsepower is proportional to the product of torque and speed.

FIG. 3 shows that motor 14 is of the variable displacement type. This is typical for wheel loaders while fork lift trucks usually have motors with fixed displacements. A second speed pickup 48 inputs the speed of the motor shaft 50 to the microprocessor 40. Based on commands from microprocessor 40 to servovalve 52, servo piston 54 is signaled through lines 56 and 58 to alter the position of swashplate 60 in motor 14. Servovalve 52 is connected to a supply valve 62. Supply valve 62 is hydraulically interposed between the two system pressure lines 32 and 34. Valve 62 supplies servovalve 52 with fluid from whichever side of the loop has lower pressure. Servovalve 52 uses this fluid to control motor 14 in the manner already described with respect to servovalve 24 and pump 12.

Microprocessor 40 is connected to a forward-neutral-reverse (FNR) switch, the throttle pedal and the brake-/inch pedal to receive inputs from the operator.

With this circuit, an optimum driving performance of the automotive controlled vehicle is achieved. Vehicles are called automotive controlled when the driver controls the vehicle speed only by the throttle pedal position. This is similar to cars with automatic gear shifting. When the driver sets the FNR switch to F the microprocessor controls the pump displacement for the forward direction of the vehicle. In the prior art the microprocessor sets the pump displacement proportional to the engine speed (FIG. 1). This gives more erratic behavior when compared to vehicles with torque converters which are smoother responding when the speed is reduced while the load on the transmission is increased. By feeding the pressures of the lines 32 and 34 via the pressure sensors 44 and 46 to the microprocessor 40, the delta pressure of the system lines is known and is used to destroke the pump 12 in the present invention. This improved behavior of the vehicle is illustrated in FIG. 4. Generally, increasing engine rpm increases the swashplate angle and increasing delta pressure decreases the swashplate angle. This feature is very advantageous for wheel loaders when they are used for finish grading operations. The driver can control the pressure, and so the tractive force, via setting the engine speed with the throttle pedal.

Figure 2:
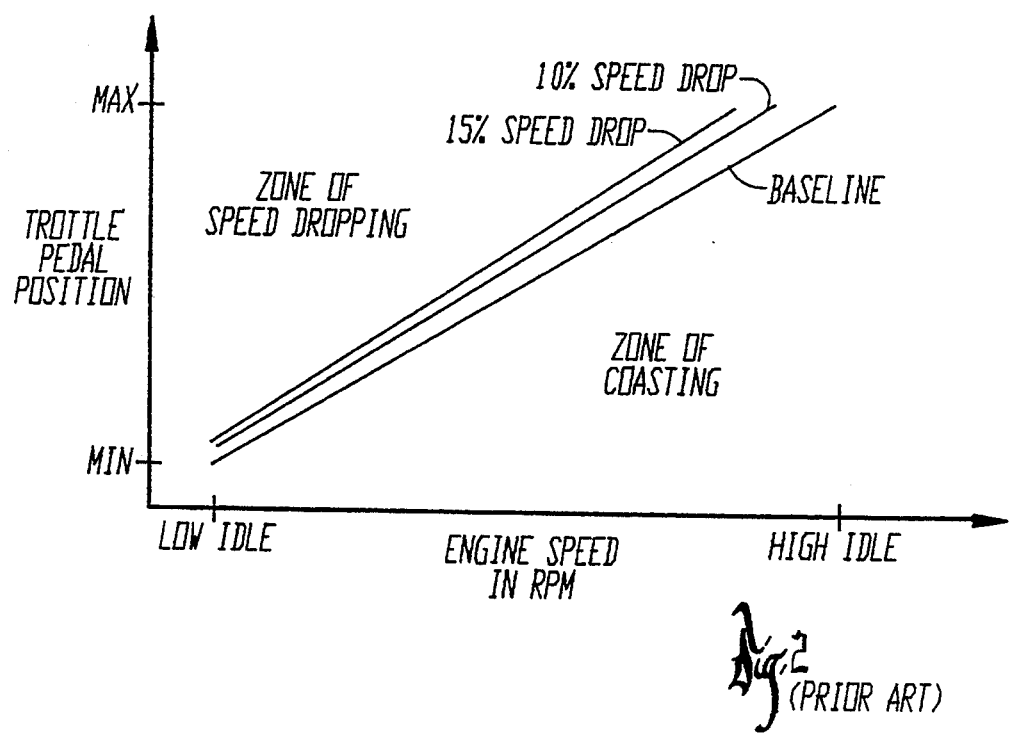
FIG. 2 is a graph of engine speed versus throttle pedal position showing a baseline curve and curves where engine speed is reduced by ten percent and fifteen percent respectively.

The microprocessor 40 makes it easy to optimize the pressure influence on the swashplate angle via parameter changes in the software. A nonlinear pressure dependency is shown in FIG. 5. By changing the parameter, the maximum power consumption from the pump 12 can be optimized to the engine characteristics. The generally vertical line in FIG. 5 depicts a line of constant pump torque. This gives the rpm for the maximum engine droop. An additional anti-stall function is not needed. By superposing the information from the actual throttle position and the speed drop learning curve according to FIG. 2, the engine speed drop can be effectively reduced by having the microprocessor reduce the swashplate angle. This is very useful, when high vehicle speeds are demanded in conjunction with low engine speed.

In the prior art, when the vehicle was at high speed and the driver removed his foot from the throttle pedal to coast or roll out, the swashplate angle was reduced along a linear ramp. It was always a compromise to find a ramp, suitable for all vehicle conditions (roll out on flat ground, uphill driving, downhill driving, vehicle loaded, vehicle unloaded). When ascending a hill the engine is easily stalled, but on flat ground the braking is too hard. Now, with the present invention and the information about the system pressure, the vehicle can roll out smoothly by controlling the swashplate angle such that the difference between the system pressures stays minimal or even zero. When descending a hill the braking pressure can be kept the same or slightly increased.

In this mode the engine braking capacity is limited. By changing the pumps high pressure relief valves to electronic proportional pressure relief valves, the braking of the vehicle can be increased without exceeding the engine braking capacity by setting the relief valves to the actual braking pressure and then reducing the swashplate angle, and so the torque to the engine. With this concept, the braking capacity of the hydrostatic transmission is increased and the vehicle brake can be reduced or the wear of the mechanical brake is reduced and the maintenance of the brake can be performed less frequently.

During braking of the vehicle, the position of the brake pedal is monitored by the microprocessor which controls the system pressure for braking as a function of the pedal position. Then the microprocessor controls the braking pressure via signals to the servovalve 24 or additionally with signals to the pressure relief valves when the maximum braking capacity of the engine is reached.

When a variable motor 14 is utilized in the circuit, the control of the displacement of the motor is needed optimize roll out and braking. In this case, the torque to the wheels is not only proportional to the system pressure, but also to the displacement. To get a braking torque proportional to the brake pedal position the system pressure and the displacement must be controlled. The information about the motor displacement can be derived from the input signal to the servovalve 52 if the servovalve is has angular feedback or by calculating the displacement from the pump flow and the motor speed. During normal acceleration the displacement of the pump is first increased, then the motor displacement is reduced in order to increase vehicle speed. In some applications these adjustments are overlapped, so the motor displacement starts decreasing when the pump is at three-quarters of full displacement. This is dynamically advantageous.

The present achieves improved driving performance by feeding the system pressures into the microprocessor and influencing the swashplate position for more smooth driving behavior and by using the pressure sensors for improving coasting performance by controlling system pressure during braking and roll out instead of simply reducing the swashplate angle along a linear ramp.

What is claimed is:

1. A driving mechanism for a vehicle, comprising:
   a plurality of wheels drivingly supporting a vehicle frame;
   an engine on said vehicle frame for supplying rotary power at a speed to said wheels;
   a hydrostatic transmission on said vehicle frame including a pump having variable displacement operatively connected to said engine and to at least one hydraulic motor;
   said hydraulic motor being drivingly connected to at least one of said wheels for propelling the vehicle;
   said hydrostatic transmission generating a system pressure in a pair of fluid conduits between said variable displacement pump and said hydraulic motor;
   electronic control means connected to said engine and said hydrostatic transmission for controlling the displacement of said variable displacement pump based on said speed of said engine and said system pressure of said hydrostatic transmission;
   sensing means operatively attached to said pair of fluid conduits for sending signals indicative of said system pressure to said electronic control means; and
   whereby said electronic control means is responsive to said system pressure and commands said variable displacement pump to alter its displacement.

2. The driving mechanism of claim 1 wherein said electronic control means is a microprocessor.

3. The driving mechanism of claim 1 wherein the displacement of said variable displacement pump is reduced when said system pressure is increased.

4. The driving mechanism of claim 1 wherein said hydraulic motor has variable displacement and said electronic control means controls said variable displacement pump and variable displacement hydraulic motor displacements.

5. The driving mechanism of claim 1 wherein a throttle pedal is operatively attached to said engine and electronic control means and coasting of the vehicle is controlled by controlling said system pressure of said hydrostatic transmission when said throttle pedal is released while the vehicle is driven.

6. The driving mechanism of claim 5 wherein a brake pedal positionable in a plurality of positions is operatively attached to said electronic control means such that when said brake pedal is actuated said system pressure of said hydrostatic transmission is controlled based upon which of said plurality of positions said brake pedal is positioned in.

7. The driving mechanism of claim 6 wherein said hydrostatic transmission includes a pair of electrically proportional high pressure relief valves operatively connected respectively to said pair of fluid conduits and said electronic control means whereby said relief valves are adjusted proportionally to the position of said brake pedal, and in parallel, the displacement of said variable displacement pump is controlled if said brake pedal is actuated.

8. The driving mechanism of claim 1 wherein the variable displacement pump includes a pivotal swashplate such that when said pivotal swashplate is positioned at an angle from vertical a corresponding displacement of said variable displacement pump results and wherein said electronic control means comprises: an electronic automotive control system and said electronic automotive control system controls said angle from vertical of said pivotal swashplate based upon said speed of said engine and said system pressure of said hydrostatic transmission and inputs from a throttle pedal, a brake pedal, and a FNR switch all operatively connected to said electronic automotive control system.

* * * * *